Figure 1:
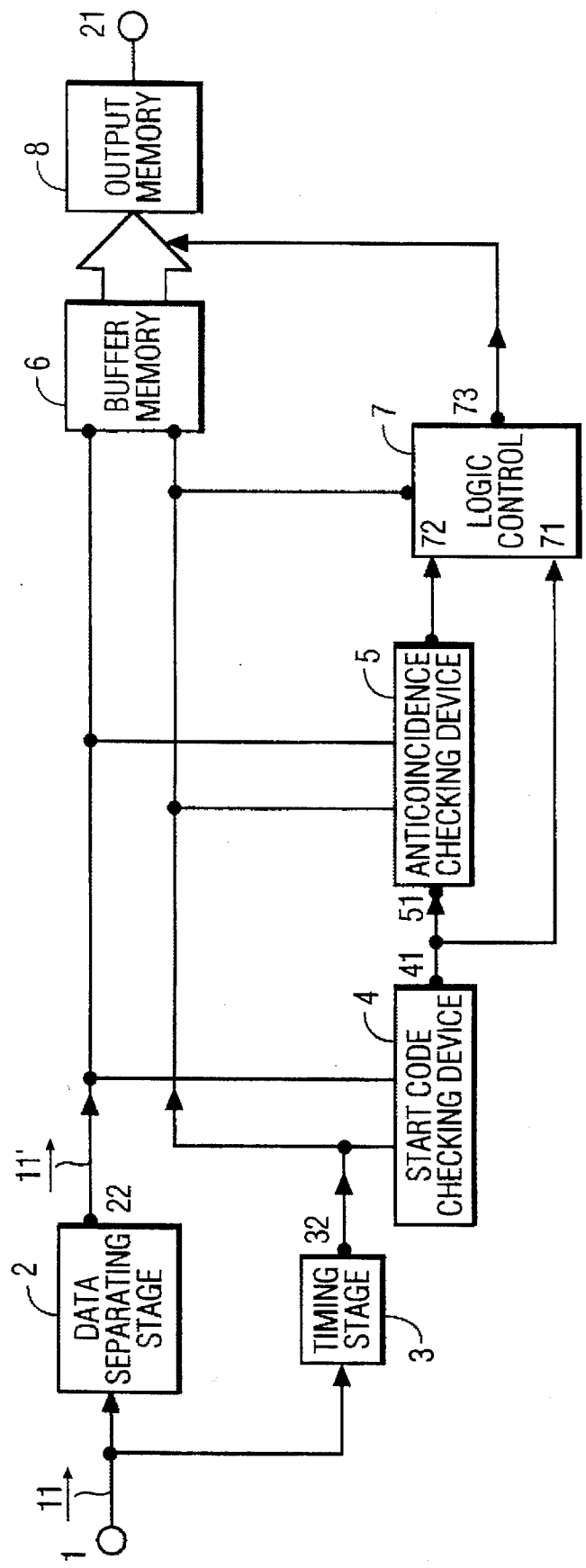

United States Patent [19]

Heller et al.

[11] Patent Number: 5,627,595
[45] Date of Patent: May 6, 1997

[54] SDYSTEM FOR TRANSMITTING AND DECODING BIPHASE DATA, IN PARTICULAR FOR VPS

[75] Inventors: Arthur Heller, Eichenried; Klaus Schuster, Landshut, both of Germany

[73] Assignee: Telefunken, Hanover, Germany

[21] Appl. No.: 524,730

[22] Filed: Sep. 7, 1995

Related U.S. Application Data

[63] Continuation of Ser. No. 363,953, Jun. 9, 1994, abandoned, which is a continuation of Ser. No. 27,733, Feb. 22, 1993, abandoned.

[30] Foreign Application Priority Data

Jun. 23, 1990 [DE] Germany ............... 40 20 066.3

[51] Int. Cl.$^6$ ............................................. H04N 7/087
[52] U.S. Cl. ........................ 348/478; 348/473; 348/465
[58] Field of Search ........................... 348/460, 461, 348/465, 466, 468, 469, 473, 478, 476; 358/147, 142; H04N 7/08, 7/087

[56] References Cited

U.S. PATENT DOCUMENTS

| | | | |
|---|---|---|---|
| 3,961,137 | 6/1976 | Hutt et al. | 348/478 |
| 4,025,851 | 5/1977 | Haselwood | 325/31 |
| 4,115,811 | 9/1978 | Goff | 348/622 |
| 4,805,020 | 2/1989 | Greenberg | 358/147 |
| 4,841,365 | 6/1989 | Guenot et al. | 358/147 |
| 5,075,773 | 12/1991 | Pullen | 358/142 |
| 5,136,382 | 8/1992 | Meyer | 358/147 |
| 5,223,930 | 6/1993 | Zato | 358/147 |
| 5,237,412 | 8/1993 | Nakajima | 358/147 |

FOREIGN PATENT DOCUMENTS

| | | | |
|---|---|---|---|
| 264883 | 11/1986 | Japan | H04N 7/87 |
| 035789 | 2/1987 | Japan | H04N 7/87 |
| 084688 | 4/1987 | Japan | H04N 7/87 |
| 0144676 | 6/1988 | Japan | H04N 7/87 |

OTHER PUBLICATIONS

Videoprogrammsystem der 2 Generation 1234 Nachrichten Elektronik Telematik 40 Aug. 1986 No. 7/8 pp. 311 to 315.
Datenubertragung In Einer Zeile Des Fernsehsignals 15 Mar. 1972 pp. 88 to 93.

Primary Examiner—John K. Peng
Assistant Examiner—Chris Grant
Attorney, Agent, or Firm—Joseph S. Tripoli; Peter M. Emanuel; Thomas F. Lenihan

[57] ABSTRACT

A method of transmitting and decoding biphase coded signals individually representing separate data services and inserted in the line blanking interval of a video signal greatly increases the probability of avoiding the effects of anticoincidence errors. A unique start code is allocated to each of the data services prior to transmitting the video signal. The video signal is separated into the separate data services without field or line windowing. Every pair of biphase elements occurring after the start code is checked for anticoincidence errors, and all wanted bits are stored in a buffer memory. The wanted bits are transferred from the buffer memory to an output memory only when no anticoincidence error has occurred between the start code and the last wanted bit.

5 Claims, 1 Drawing Sheet

SDYSTEM FOR TRANSMITTING AND DECODING BIPHASE DATA, IN PARTICULAR FOR VPS

This is a continuation of application Ser. No. 027,733, filed Feb. 22, 1993 now abandoned.

This is a continuation of application Ser. No. 363,953, filed Jun. 9, 1994 now abandoned.

This is a continuation of PCT application PCT/EP 91/01117 filed Jun. 15, 1991 by Arthur Heller and Klaus Schuster and titled "SYSTEM FOR TRANSMITTING AND DECODING BIPHASE CODED DATA, IN PARTICULAR FOR VIDEO PROGRAM SYSTEM".

This invention is directed to a system for transmitting and decoding biphase coded data, particularly video program system (VPS). Such a system is described in "Rundfunktechnische Mitteilungen" (Technical Information on Broadcasting), Vol. 16 (1972), issue No. 2, pp. 90 and 91.

For many years, biphase-coded data have been transmitted in lines in the vertical blanking interval of a television signal. Initially for internal operational purposes only, however, ultimately also for applications involving the viewer. The known VPS system for the recording of programs controlled by the program itself using home video recorders also makes use of this type of data transmission, in this case using line 16.

The initial published state for this type of transmission and decoding technique (Voigt, K.: "Datentibertragung in einer Zeile des Fernsehsignals" (Data Transmission in a Line of a Television Signal, Rundfunktechnische Mitteilungen 16 (1972), issue No. 2, pp. 90 and 91) is based on the simultaneous utilization of a complementary pair of lines, i.e. lines 16 and 329 for one and the same data service, as can be seen from pictures 5 and 7 in this publication.

The retrieval of the data lines on the receiver side, in this publication, does not make use of line counting (windowing); the task in this publication does not require any protection against confusion with other data services in the blanking interval because videotext (teletext) had not yet been invented at that time. The biphase pair of data lines 16/329 transmitted the only data service in the video signal. On the other hand, the danger of confusion with coincidentally plausible biphase data structures in the picture content lines was and is considerably less. This also explains why, in the concept described in this publication, each data word is written, individually and directly after its transmission, into an output data memory, when no anticoincidence operation infringing the biphase rule has been detected up until that point.

In the further course of the development and application of the biphase data transmission, each of the two blanking interval lines 16 and 329 was allocated a separate "service": line 16 became a source-related line and line 329 became a segment-related data line for internal operational identification and monitoring purposes. Therefore, it also became necessary to perform a field selection on the receiver side in order to be able to distinguish between the; two services which use an identical data format, including the start code.

The VPS system is also described in Technische Richtlinie [Technical Guidelines] ARD/ZDF No. 8 R 2, 1st edition, Dec. '84/Feb. '85. Here, windowing at line 16 is required in addition to field selection (p. 7 of said Guidelines), particularly in order to screen off the videotext data transmitted in the same field.

In those countries where VPS has been introduced up until now (Federal Republic of Germany, Austria and Switzerland), corresponding to the valid standard, line 16 is used uniformly as the position for the associated biphase data line. All integrated VPS decoder components on the market (e.g. Valvo module SAF 1134/1135) "expect" the data relevant to VPS to definitively and exclusively be in line 16. This means that they first derive the synchronizing signal from the video signal which is being fed in, generate a "window" from this signal for the first field, and then determine the position of the final, valid window for line 16 by means of line counting. Only when this final window signal is available is the actual data decoding, i.e. start code detection, checking for biphase errors, initiated.

There are disadvantages with the decoding concept generally in use at the present time. First, the notable additional expenditure for sync separator to separate the synchronizing signal composition from the video signal, and also the expenditure for a device to select the odd-numbered field and, finally, for a line counter. In particular, the device for selecting the odd-numbered field often works relatively unreliably if fed with nonstandard video signals, for example, signals where the luminance components are below black in the range of the last active lines of a field. However, an even greater disadvantage has proved to be selecting line position 16 as the only line position used for VPS. When VPS is to be introduced into other countries, for example in Scandinavia or France, where line 16 is already in use a problem arises. In France, for example, line 16 is already used for an internal operational service, and can be repositioned on another line position only after considerable expenditure on hardware (converting a multitude of existing operating devices). In cases such as this the chances of introducing VPS would be much more favorable if VPS decoders were to function independently of the line or field position of the associated biphase data line, i.e. if any random blanking interval line could be used for the VPS transmission, and indeed, without varying the selection criterion at the decoder.

It is an object of the present invention to provide a system for transmitting and decoding biphase data which, with a fixed decoder configuration, permits the free selection of the line and field position for the data line used, and which also provides a high degree of protection against confusion with other data services transmitted at the same time and in the same video signal and which also reduces the expenditure on the decoder.

The FIGURE is a block diagram of a preferred embodiment of a data line decoder in accordance with the invention. The video signal 11 which is input to the decoder input 1 contains, and this corresponds to ;the real situation, several independent data services in its vertical blanking interval, for example, NRZ-coded videotext data in some lines and also two biphase-coded services, perhaps a segment data line used for internal operational purposes (broadcaster and/or post office), and the source data line also used for VPS. According to the object of the invention, the line position in which the data for the services are transmitted must be irrelevant to the decoder of the respective service. A first step in accomplishing this goal relates to the data format to be transmitted: each biphase-coded data service must use an individual start code. For example, the VPS and source data line can have the bit element pattern defined in the VPS specification, for example:

$$10\ 00\ 10\ 10\ 10\ 01\ 10\ 01 \qquad (1)$$

The segment data line, if such is present, can use a different pattern, for example:

$$00\ 11\ 10\ 11\ 00\ 01\ 00\ 10 \qquad (2)$$

Both patterns must infringe the anticoincidence rule which is valid for the wanted data area, that is, for example, contain three logic zero elements or three logic 'one' elements in sequence. Additionally, the selection should be made such that the bit patterns cannot be confused, to the greatest extent possible, with each other, or with themselves together with the preceding start code during the serial feeding into a shift register. That is, it is necessary that as many transmission errors as possible are needed in order to either convert one pattern into the other pattern, or to produce a desired pattern at the wrong time.

The entire video signal 11 is fed directly to a data separating stage 2 and a timing stage 3 without field or line windowing (i.e. counting). The timing stage 3 derives the associated system phase (clock cycle) from the data sequence and makes it available at output terminal 32 with the correct phase in relation to the data supplied by the data separating stage 2 to output terminal 22. A level discriminator having, if applicable, an adaptively controlled decision threshold at 50% of the video data amplitude, serves as the data separating stage 2. The video signal 11 is formed in this way into a two-level signal 11' and is no longer subjected to field windowing or line windowing during the remainder of the decoding procedure. The two-level signal 11' is fed directly to the start code checking; device 4, the anticoincidence checking device 5 and the buffer memory 6, together with the system clock from output terminal 32.

The start code checking device 4 contains, for example, a binary comparator, which has a start code bit element pattern, such as pattern (1) for the biphase service to be decoded constantly applied to it as the desired input value. The actual input values are connected to the outputs of a shift register which parallels the two-level video signal 11' which is serially fed in. When the desired and actual values are identical, the presence of the true start code in the associated data line, or a putative start code as a random constellation roughly in a videotext line, or even a picture content line, is signaled at output terminal 41. The parity signal at output terminal 41 signals, via input terminal 51 of the anticoincidence checking device 5, the phase of the bit element pairs to be compared (a detailed explanation of this can be found in the German patent specification DE 30 20 530). The parity signal at terminal 41 is also fed to the control logic 7. This is designed such that a takeover pulse only appears at the control logic output terminal 73 if no anticoincidence error has been input to input terminal 72 between start code registration at input terminal 71 and the end of the transmission of the last wanted bit, i.e. after 208 system cycles from the start code registration. The takeover pulse from output terminal 73 has the effect that the data temporarily stored in the buffer memory 6 during the course of the data transmission is transferred into the output memory 8, and that the data available at output terminal 81 of output memory 81 is information which has been check for errors and service allocation.

It has already been mentioned above that the start code checking device 4 could, owing to the absence of windowing, incorrectly recognize, for example, a videotext line or a picture content line as a biphase data line. The 16 elements of the start code presuppose a probability of such a mistake as 1:65,000 which can be further worsened if spectral-type random data signals, such as videotext, are to be screened off. This is not adequate for reliable decoding.

If only the first wanted word following the start code were to be decoded (in accordance with the state-of-the-art method from 1972 identified above, and used at a time when there was not yet any videotext in the blanking interval) and if the first wanted word were accepted into the output memory directly after its transmission, then the anticoincidence checking which starts after the start code is recognized would improve the probability of a mistake arithmetically by a factor of only 255. The reason for this is that only the subset of combinations of the additional 16 wanted bit elements is applicable which correspond to the biphase anticoincidence rule.

However, a significant step is taken when all of the 208 wanted bit elements of the entire data line are used, as an extended start code so to speak. In such a case a "rigid" form is not used, instead only the subset combinations which are free of anticoincidence errors are used. A substantially higher, reliability factor of $>10^{30}$ results. The acceptance of the decoding of the first wanted word does not rely on the word itself exhibiting no anticoincidence error because a videotext line could do so by chance. Instead, the first wanted word is only considered as belonging to the desired service and having been transmitted error-free if no anticoincidence error is detected in all the remaining twelve wanted words.

An addition beneficial property results with the inventive method because of its high reliability in recognizing service allocation and transmission errors. First, the biphase prior art method only provides reliable protection against individual errors. If, as a result of a double error, both elements of a wanted bit have been transmitted incorrectly, i.e. both are inverted, the bit cannot be recognized as incorrect for the anticoincidence check. The inventive method is also advantageous in such a case. The probability that a double error will appear in a disturbed transmission without at least one individual error appearing among the 108 bit pairs and being recognized as an anticoincidence error is very low. With the invention such an occurrence would be recognized and the entire data line would be rejected.

We claim:

1. A method of transmitting and decoding biphase coded signals individually representing separate data services and inserted in the line blanking interval of a video signal, said biphase coded data comprising pairs of bi-phase elements, said method comprising the steps of:

allocating a unique start code to each of the data services prior to transmitting said video signal;

receiving said video signal and separating said biphase coded data from said video signal without field or line windowing, and distinguishing between data of said separate data services by examining said start code for a particular value;

checking every pair of said biphase elements occurring after said start code for anticoincidence errors;

storing all wanted bits in a buffer memory; and transferring said wanted bits from said buffer memory to an output memory only when said particular value of said start code has been detected and no anticoincidence error has occurred between said start code and the last wanted bit.

2. A system for decoding biphase coded data inserted in the vertical blanking interval of a video signal, comprising:

an input for receiving said video signal and said biphase coded data;

a data separating stage for separating said biphase coded data from said video signal without field or line windowing;

a timing stage for generating timing signals;

a start code detection stage for identifying a particular start code, said start code detection stage being coupled to said data separating stage and to said timing stage for receiving data and timing signals therefrom respectively;

an anticoincidence detector for detecting errors in said biphase coded data, said anticoincidence detector being coupled to said data separating stage and to said timing stage for receiving data and timing signals therefrom respectively, said anticoincidence detector generating an error detection signal in the presence of said errors;

a logic stage coupled to said start code detector stage, to said anticoincidence detector stage, and to said timing stage for receiving signals therefrom, and generating a control signal in the absence said error detection signals generated during a period beginning with detection of said particular start code of data in a given video line and ending when said timing signals indicate reception of the last data bit of said video line;

a buffer memory for temporary storage of said biphase coded data, said buffer memory being coupled to said data separating stage and to said timing stage for receiving data and timing signals therefrom respectively, said buffer memory transferring said data to an output in response to said control signal; and memory means for receiving said data from said output of said buffer memory.

3. The system of claim 2, wherein:

said separating stage is a level discriminator, and said start code detection stage is a binary comparator comparing a received start code with a stored start code.

4. The system of claim 3, wherein:

said data contained in said video line: comprises a group of data words and all of said data words of a particular video line must be error-free for any of said data words of said particular video line to be transferred to said output memory.

5. A system for decoding data transmitted in groups with a video signal, comprising:

a data separating stage receiving said video signal and said data, for separating said data from said video signal without windowing;

a start code detection stage coupled to said data separating stage for identifying a particular start code of said data and generating a first control code in response thereto;

a detector coupled to said data separating stage for detecting errors in said data and generating an error detection signal in response thereto;

a logic stage coupled to said start code detector stage for receiving said first control code, and to said detector stage for receiving said error detection signal, and generating a second control signal in the absence of said error detection signals generated during a period beginning with detection of said start code of a group and ending with reception of the last data bit of said group;

a buffer memory coupled to said data separating stage for receiving data, said buffer memory transferring said data to an output in response to said second control signal; and memory means for receiving said data from said output of said buffer memory.

* * * * *